Patented Dec. 8, 1931

1,834,973

UNITED STATES PATENT OFFICE

JAMES W. SCHADE, OF AKRON, AND HARLAN L. TRUMBULL, OF HUDSON, OHIO, ASSIGNORS, BY MESNE ASSIGNMENTS, TO AMERICAN ANODE INC., OF AKRON, OHIO, A CORPORATION OF DELAWARE

RUBBER PRODUCT AND METHOD OF MAKING SAME

No Drawing. Application filed August 24, 1928. Serial No. 301,943.

This invention relates to the production of rubber goods from scrap or waste vulcanized rubber, such as defective, used and discarded rubber products, and particularly to an improved method of making such products and to the products so made.

There is an enormous economic loss in the rubber industry at the present time because of the inability to utilize more fully the vast quantities of scrap rubber everywhere available at very low cost. Heretofore it has been a common practice to heat and at the same time to treat chemically scrap vulcanized rubber so as to remove any fabric therein and to "devulcanize" the rubber, then to wash, dry and refine by a grinding operation to produce a somewhat plastic mass. In this way, a "reclaimed rubber" so-called is produced which finds some limited uses in the ordinary mill-mix and mold-cure methods employed commonly in the manufacture of rubber goods, but an extended use of this product has not been found to be practical.

The present invention provides a new way of utilizing scrap vulcanized rubbers and one that is capable of producing rubber products of improved quality where the products are made entirely from vulcanized scrap, or, one which enables the use of larger proportions of vulcanized scrap in products containing both new and scrap rubber, while maintaining the quality of similar products made by prior processes.

In carrying out our invention, scrap vulcanized rubber, such as that from old tires, tubes, shoes, and the like, is softened or plasticized in any manner adapted for the type of scrap being employed, such as by digesting or masticating the scrap, either with or without heat and/or softening agents, or by any of the so-called reclaiming processes.

When the rubber scrap contains fabric, it is preferable before plasticizing the same to remove the fabric by grinding and mechanical picking of the fabric from the rubber, or the ground scrap may be subject to chemical action to remove the fabric. Other impurities or foreign bodies may be removed in any suitable manner. The plasticized scrap prepared by whatever process is then dispersed in an aqueous medium to produce a dispersion of the scrap rubber, that is, the rubber in very fine particles is suspended or emulsified in a water phase containing emulsifying agents.

The plasticizing and emulsifying steps may be coordinated by adding during the plasticizing step ingredients which will serve as, or form with other ingredients, emulsifying agents for the scrap rubber during the dispersion operation. Thus, a saponifiable oil or resin, a fatty acid, or the like, may be used to effect, or assist in effecting, the plasticizing of the scrap, to which may be added during plasticizing, or afterward, or during dispersion, an alkali which will form with the softener an emulsifying agent capable of accelerating and/or stabilizing the dispersion of scrap rubber particles in the liquid medium.

The vulcanized scrap now dispersed in liquid medium is in a condition to be made into useful products, which may be done by electrodepositing the rubber from the liquid dispersion upon anodic molds, plates or screens, or the dispersed rubber particles may be deposited from the liquid medium by any other well-known means whether electrical, chemical or mechanical.

Where the rubber product to be made from the vulcanized scrap is not to be made from the scrap alone, other ingredients may be added at any stage of the process. Thus, in the plasticizing of the scrap such softening agents may be employed as will impart beneficial properties to the final product. Other ingredients than softening agents may however be added during the plasticizing operations, but we prefer to add the ingredients which it is desired to employ to modify the properties of the end product to the emulsified vulcanized scrap rubber. Thus, the common compounding ingredients, such as pigments, fillers, softeners, vulcanizing agents, accelerators and antioxidants, may be readily stirred into the emulsified scrap by first making a water paste or water dispersion thereof. Water dispersions of rubber, either natural or artificial, may also be added to the dispersed scrap, where desired.

In one embodiment of our process the following procedure is followed. Old inner tubes are ground and placed on a hot rubber-mill and masticated with the addition of a softener, such as aldol, alpha-naphthylamine, terpenes, mineral oils, vegetable oils, asphalts, kiln pine tar, pine tar oil, rosin oil and similar substances until the mass assumes a smooth plastic condition, 5 per cent. by weight of oleic acid may also be added to the mass during the plasticizing action. This mass is then placed in a suitable masticator, such as of the internal mixer type, and 100 parts of a 6% solution of ammonia gradually worked into the batch. This is followed by the slow addition of a 1% ammonia solution until an inversion of the rubber and water phases occurs. The resultant product is a viscous paste comprising rubber in the disperse-phase and a water soap solution, with any other emulsifying agents present, in the continuous phase, the soap having been formed by the action of ammonia on the oleic acid, the excess ammonia acting as a stabilizing agent of the dispersion.

Where a vulcanizable product is desired, an aqueous dispersion of sulfur and of other vulcanizing agent in suitable amounts may be mixed into this aqueous dispersion of vulcanized scrap rubber, such for example as three per cent. of sulfur, one-half per cent. organic accelerator, etc., on the dry weight of the scrap rubber, and treated scrap rubber dispersion then placed in an electrophoretic apparatus and the dispersed particles electro-deposited at the anode of the apparatus. When dried and cured, the resulting product possesses a smooth firm texture.

In another embodiment of our invention, ground tire casings are placed in a digester and treated with steam and a chemical capable of destroying the fiber and, after washing and drying, the rubber crumb is plasticized with a suitable softener. This plasticized vulcanized rubber is then placed in a masticating machine and five per cent. or more of sodium stearate or sodium oleate, or other emulsifying agent admixed therewith. Mastication is continued with the slow addition of water until the rubber becomes dispersed in fine particles in the external aqueous phase. Stabilizing agents may be added to this dispersion if desired, and it may be diluted with water to form an emulsion of any desired consistency. Superior products may be made from this emulsified vulcanized rubber by adding thereto dispersions of crude rubber and of vulcanizing agents, of which products the following are illustrative:

(1) An aqueous emulsion comprising the above-mentioned vulcanized rubber emulsion containing 95 parts dry weight of vulcanized rubber, was mixed with an emulsion containing 3 parts by weight of sulfur and one part by weight of an organic accelerator and placed in an electrophoretic apparatus and an effectively unidirectional electric current of suitable current density (0.5 to 1 ampere per sq. cm.) passed through the emulsion forming a sheet of rubber at the anode which, when dried and vulcanized, possessed a tensile strength of 700 pounds per sq. in. and an elongation of 460 per cent.

(2) An aqueous emulsion comprising equal parts by weight of the above described vulcanized rubber emulsion and a crude rubber emulsion, the weights being computed as the dry weight of the solid content of the emulsion, two per cent. of sulfur and one-half per cent. of organic accelerator, based on the rubber content of the emulsion, was placed in an electrophoretic apparatus and a sheet of rubber formed at the anode, which was dried and vulcanized to produce a sheet of firm smooth texture having a tensile strength of 2,440 pounds per sq. in. and an elongation of 775 per cent.

It is to be understood that the specific examples hereinabove are given merely by way of illustration and are in no way restrictive of applicants' process which broadly involves a method of utilizing vulcanized rubber scrap by first bringing it to a plastic condition, dispersing the plasticized scrap in an aqueous medium, associating where desired modifying substances with the vulcanized scrap either before, during or after plasticizing or with the aqueous dispersion, and making from such dispersions of vulcanized scrap rubber useful products by precipitating therefrom the suspended particles thereof on a suitable deposit-receiving member by any suitable means, such as dipping, spreading, spraying, extruding, electrophoresis and the like.

The term "rubber" is used herein to include caoutchouc, balata, gutta percha and other rubber-like gums from laticiferous plants. The term "plasticized vulcanized scrap rubber" indicates any form of waste or used vulcanized rubber which has been treated to convert it into a smooth plastic state whether or not other materials have been added to or subtracted from the scrap before, during or after the treatment.

Numerous modifications and variations of the process herein described may be made without departing from the principles of this invention and we consequently do not desire to limit the appended claims except as may be necessitated by the prior art.

We claim:

1. A process for making rubber products from vulcanized scrap rubber which comprises plasticizing the vulcanized rubber scrap, dispersing the plasticized scrap in fine particles in a liquid containing an emulsifying agent, coagulating the dispersed particles from the liquid emulsion by the migration of coagulating ions from a depositing base, and drying the product.

2. A process for making rubber products from vulcanized scrap rubber which comprises plasticizing the vulcanized rubber scrap, dispersing the plasticized scrap in fine particles in a liquid containing an emulsifying agent, intimately mixing into said liquid dispersion other dispersions of ingredients capable of modifying the properties of the dispersed scrap rubber in the precipitated product, electrodepositing from the liquid emulsion dispersed particles, and drying the electrodeposited product.

3. A process for making rubber products from vulcanized scrap rubber which comprises plasticizing the vulcanized rubber scrap, dispersing the plasticized scrap in fine particles in a liquid containing an emulsifying agent, electrodepositing from the liquid emulsion dispersed particles, and drying the electrodeposited product.

4. A process for making rubber products from vulcanized scrap rubber which comprises plasticizing the vulcanized rubber scrap, dispersing the plasticized scrap in fine particles in a liquid containing an emulsifying agent, intimately mixing into said liquid dispersion other dispersions of ingredients capable of modifying the properties of the dispersed scrap rubber in the precipitated product, including vulcanizing agents, thereafter coagulating the dispersed particles of the liquid dispersion by the migration of coagulating ions from a depositing base, and drying and vulcanizing the precipitated composition to form a compact homogeneous product.

5. A process for making rubber products from vulcanized scrap rubber which comprises plasticizing the vulcanized rubber scrap, dispersing the plasticized scrap in fine particles in a liquid containing an emulsifying agent, intimately mixing into said liquid dispersion other dispersions of ingredients capable of modifying the properties of the dispersed scrap rubber in the precipitated product, including an aqueous dispersion of rubber, electrodepositing from the liquid emulsion the dispersed particles, and drying the electrodeposited product.

6. A process for making rubber products from vulcanized scrap rubber which comprises coagulating the dispersed particles from an aqueous dispersion comprising scrap rubber, by the migration of coagulating ions from a depositing base.

7. A process for making rubber products from vulcanized scrap rubber which comprises coagulating the dispersed particles from an aqueous dispersion comprising scrap rubber and natural rubber latex, by the migration of coagulating ions from a depositing base.

8. A process for making rubber products from vulcanized scrap rubber which comprises electrodepositing the dispersed particles from an aqueous dispersion comprising scrap rubber and natural rubber latex, on a deposition base.

In witness whereof we have hereunto set our hands this 24th day of July, 1928.

JAMES W. SCHADE.
HARLAN L. TRUMBULL.